May 29, 1956 C. PAOLONI ET AL 2,748,072
APPARATUS FOR PRODUCING ALKALI METAL HYDROXIDE
Filed Sept. 24, 1952
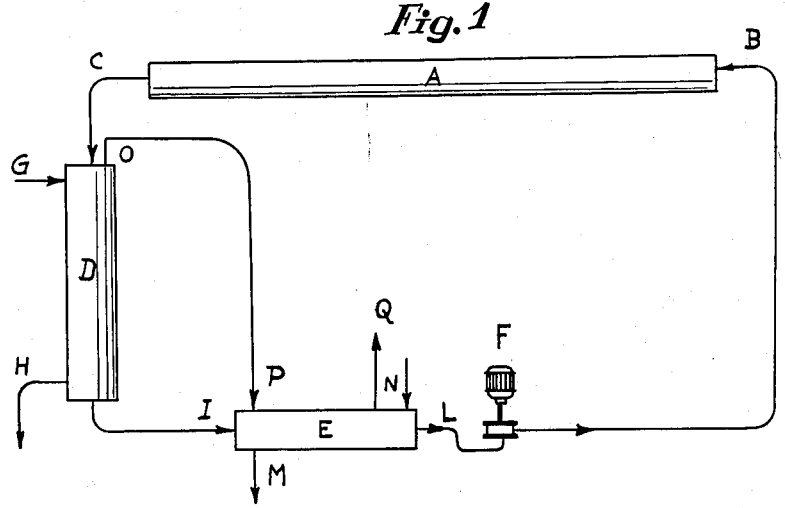
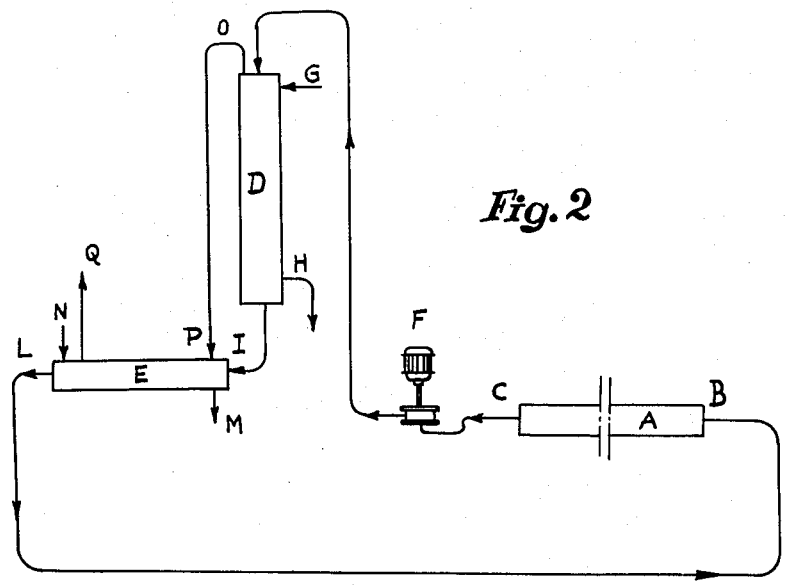
INVENTORS
CARLO PAOLONI
PIETRO PENNETTI
BY *Robert E. Burns*
ATTORNEY US Patent Office 2,748,072
Patented May 29, 1956

2,748,072

APPARATUS FOR PRODUCING ALKALI METAL HYDROXIDE

Carlo Paoloni and Pietro Pennetti, Turin, Italy, assignors to Rumianca S. p. A., Turin, Italy Application September 24, 1952, Serial No. 311,282

Claims priority, application Italy July 2, 1952

1 Claim. (Cl. 204—220)

It is known that in mercury cathode electrolytic cells for the production of caustic soda, the sodium amalgam produced in the primary cell is successively decomposed in the so-called secondary cells or decomposers, in which the amalgam is reacted with water in order to form caustic soda and hydrogen, while the regenerated mercury is re-cycled by returning it to the primary cell.

Amalgam decomposers were up to some time ago of a horizontal construction, comprising a channel of square or rectangular section with an inclined bottom and of the same length as the primary cell, in which the amalgam flows on the bottom from one end to the other, as the decomposition water is supplied in counter-current.

In order to facilitate decomposition and obtain concentrated caustic soda, graphite rods are submerged on the bottom of the decomposer and short-circuit the amalgam with the caustic soda solution.

These horizontal decomposers suffer from the drawback that they are clumsy and give a caustic soda of relatively low concentration which, even if special provisions are made, in no case exceeds 50% NaOH.

So-called vertical amalgam decomposers have been developed of late, which consists of small towers filled with lump graphite, to which the amalgam is supplied at the top, while the decomposition water is supplied counter-currently or concurrently.

The filling material contained in a vertical decomposer creates therein a wide contact surface between the amalgam and water, so that a vertical decomposer generally delivers a hydroxide solution at a concentration higher than the solution supplied by horizontal decomposers, more particularly if the vertical decomposer operates counter-currently. The manner of operating a vertical decomposer co-currently or counter-currently are generally known and no special description thereof is necessary.

These vertical decomposers as associated separately with a caustic soda plant cannot, however, deliver caustic soda at high concentration, that is, over 65% NaOH, for in this case the sodium amalgam is never fully decomposed and mercury issuing from the decomposer still contains amalgam that cannot be satisfactorily returned to the primary cell. In fact, admission to the primary cell of mercury containing the amalgam would cause hydrogen to evolve and entail risk of explosion.

Moreover, when attempts are made to either improve concentration or further decomposition of the amalgam, the caustic soda is contaminated by finely suspended graphite which makes the caustic soda unsuitable for the trade.

In an attempt to raise the concentration of the alkaline solutions delivered by the decomposers, the prior art employed heating means for the decomposers in order to increase the solubility of the hydroxide or provided conveniently arranged heat exchangers. Obviously, these methods necessitate additional cost for power and installation which is not always warranted by the results obtained.

This invention relates to a decomposing apparatus by which perfectly clear and graphite-free caustic soda can be obtained with over 65% NaOH and even 73–76% NaOH content, at the same time fully decomposing the amalgam and satisfactorily re-cycling the mercury.

In fact, we have ascertained that by associating a co-currently operating vertical decomposer with a horizontal decomposing cell, so that the mercury issuing from the vertical decomposer and still containing amalgam flows to a horizontal decomposer to which water is independently supplied in counter-current, the vertical decomposer is in condition to deliver a caustic soda with a 75–76% NaOH content, while the horizontal decomposer delivers a caustic soda with an approximate 30% NaOH content.

The proportions of and distribution between the two concentrations is such that 4/5 of the caustic soda are produced with a 75–78% NaOH content in the vertical decomposer and the remaining 1/5 is produced with an approximate 30% NaOH content in the horizontal decomposer. In every case the mercury is fully deamalgamated and caustic soda is clear and graphite-free. While the vertical decomposer is of standard size, the horizontal decomposer is reduced to about 1/4 the conventional size.

It has also been found convenient, in order to promote as far as possible the decomposition of the amalgam in the vertical decomposer, to employ a graphite filling in accordance with our co-pending application, Serial No. 311,281, filed September 24, 1952, consisting of graphite bodies in the form of geometric solids with rilled surfaces.

The accompanying drawing shows diagrammatically two embodiments of the apparatus according to this invention.

In the first embodiment, A denotes an electrolyzer, that is a primary cell, from which the sodium amalgam issues at the end C and is admitted into the vertical decomposer D, the decomposition water being admitted concurrently at the point G. Highly concentrated caustic soda with 73–76% NaOH issues at the bottom at H, while mercury still containing amalgam and issuing from the vertical cell enters the horizontal cell E at the point I.

The decomposing water is admitted in to the horizontal cell E counter-current at N and caustic soda issues at M with a concentration of about 30% NaOH.

The mercury issuing in a fully deamalgamated condition at L is pumped by the pump F and re-cycled by introducing it into the electrolyzer A at its end B.

The hydrogen evolved in the vertical decomposer D isues at the top at O and is fed to the horizontal decomposer E at the point P and issues at the point Q together with the hydrogen evolved in the horizontal decomposer. This cools the hydrogen which issues at a very high temperature from the vertical cell and simultaneously heats the horizontal decomposer, thereby improving the final decomposition of the amalgam.

In the second embodiment, A denotes a horizontal electrolyzer from which sodium amalgam issues at the end C. This amalgam is drawn by the pump F and pumped to the top of the vertical decomposer D. The decomposition water enters concurrently current at G and highly concentrated caustic soda with a 73–76% NaOH content isues at H, while the mercury still containing amalgam and issuing from the vertical cell enters the horizontal cell E at I.

The decomposition water is admitted to a horizontal cell E in counter-current at the point N and caustic soda issues at M at a concentration of about 30% NaOH. The mercury issuing in a fully deamalgamated condition at L is re-cycled by returning it to the electrolyzer A through the end B.

The hydrogen evolved in the vertical decomposer D issues at the top at O and is conveyed at P to the horizontal decomposer E, whence it issues at Q together with the hydrogen evolved in the horizontal decomposer.

The above-described devices can also be utilized for producing highly concentrated caustic potash in suitable electrolyzers.

Although the examples described merely employ one electrolyzer for each unit, it is understood that the invention also covers the use of a plurality of electrolyzers associated with a vertical decomposer in series with a horizontal decomposer.

What we claim is:

A system for continuously producing highly concentrated alkali metal hydroxide, which comprises a mercury cathode electrolytic cell for producing an alkali metal amalgam, and means for decomposing said alkali metal amalgam to produce highly concentrated alkali metal hydroxide from said amalgam which comprises a co-currently operating vertical decomposer unit and a counter-currently operating horizontal decomposer unit, said vertical decomposer unit comprising a vertically-disposed vessel adapted to contain an alkali metal amalgam-decomposing catalyst, inlet means for said amalgam and water inlet means in the upper portion of said vessel, gas outlet means in the upper portion of said vessel, and an alkali metal hydroxide outlet and a partially-decomposed amalgam outlet in the lower portion of said vessel, and said horizontal decomposing unit comprising a horizontally-disposed vessel adapted to contain an alkali metal amalgam decomposing catalyst, a partially-decomposed amalgam inlet at a first end of said horizontally-disposed vessel, a gas inlet and an alkali metal hydroxide outlet at said first end, and a water inlet and a gas outlet at the other end of said horizontally-disposed vessel, conduit means connecting the partially decomposed amalgam outlet of the vertical decomposer vessel with the partially decomposed amalgam inlet of the horizontal decomposer vessel for conducting partially decomposed vessel amalgam from said vertical decomposer to said horizontal decomposer vessel, further conduit means connecting the gas outlet means of the vertical decomposer vessel with the gas inlet of the horizontal decomposer for conducting evolved gases from the vertical to the horizontal decomposer vessel, means connecting the amalgam inlet means at the upper portion of the vertical decomposer vessel with the cell for conducting the amalgam from the cell to the decomposer, and conduit means connecting the other end of the horizontal decomposer vessel with the cell for removing liberated mercury from said horizontal decomposer vessel to return it to the electrolytic cell.

References Cited in the file of this patent

UNITED STATES PATENTS

| 588,276 | Kellner | Aug. 17, 1897 |
| 2,083,648 | Gorke | June 15, 1937 |
| 2,551,248 | Deprez | May 1, 1951 |

FOREIGN PATENTS

| 453,517 | Great Britain | Sept. 14, 1936 |

OTHER REFERENCES

Chemical Engineering, July 1952, pages 265 and 266.